Nov. 21, 1939.　　G. JAEGER ET AL　　2,180,469

TRANSMISSION

Filed July 10, 1937　　4 Sheets-Sheet 3

INVENTOR.
Gebhard Jaeger.
Chris Gerst.
BY
ATTORNEYS.

Nov. 21, 1939.   G. JAEGER ET AL   2,180,469
TRANSMISSION
Filed July 10, 1937   4 Sheets-Sheet 4

INVENTOR.
Gebhard Jaeger.
Chris Gerst.
BY
ATTORNEYS.

Patented Nov. 21, 1939

2,180,469

UNITED STATES PATENT OFFICE 2,180,469

TRANSMISSION

Gebhard Jaeger, Columbus, Ohio, and Chris Gerst, Detroit, Mich., assignors to The Jaeger Machine Company, Columbus, Ohio, a corporation of Ohio Application July 10, 1937, Serial No. 152,934

18 Claims. (Cl. 192—12)

Our invention relates to a transmission. It has to do, more particularly, with a transmission which is particularly useful when incorporated in the drive between a power unit and the mixing drum of a concrete mixer, such as a truck mixer, although it is not limited in its application to mixers. Our transmission is suitable for use in any drive between a power unit and a member to be driven.

It is customary to have on truck mixers a power unit for driving the drum of the mixer. A transmission is usually incorporated in the drive between the power unit and the mixing drum. It is desirable to provide a multi-speed transmission so that the drum may be driven at different rates of speed. It is necessary to have a brake associated with the transmission which will serve to prevent rotation of the mixing drum when the drive between the power unit and the drum is disconnected. This brake serves to prevent rotation of the drum during the charging operation or at other selected periods. It is absolutely essential that the brake be effective to prevent rotation of the drum each time that the drive between the power unit and the drum is interrupted in order to prevent injury to workmen during loading, etc. Furthermore, it is desirable for the brake to be so arranged that it will produce the most effective braking action possible on the drum, inasmuch as the drum and contents are very heavy and during loading there is a tendency for the drum to rotate. Since a multi-speed transmission is employed it is desirable that it be of such a type that it can be set at a certain speed and the drive between the power unit and the drum can be connected or disconnected and the rotation of the drum can be reversed without shifting gears.

It is necessary for a transmission of this type to be simple and compact in structure in order that it can be mounted in the limited space usually available. Furthermore, it is desiirable that it be of very rugged construction so that it will hold up under the hard usage to which transmissions of this type are usually subjected. Furthermore, it is very essential that the location of the multi-speed transmission is such as to permit speed selection and shifting without difficulties, and yet not interfere with the braking action.

One of the objects of our invention is to provide a transmission of the type indicated which is of a very simple and compact structure and which is of very rugged construction.

Another object of our invention is to provide a transmission of the type indicated which has a brake associated with it and so arranged that each time the drive between the in-put shaft and the out-put shaft of the transmission is interrupted, the brake will automatically be effective to prevent rotation of the out-put shaft.

Another object of our invention is to provide a transmission of the type indicated having a brake associated therewith, the brake being so arranged that maximum braking action will be obtained.

Another object of our invention is to provide a transmission with the multi-speeds arranged such as to permit selection and shifting of gears without any difficulties.

Another object of our invention is to provide a transmission of the type indicated which is of such a nature that it may be set at a certain speed and the drive between the in-put shaft and the out-put shaft may be connected or disconnected without shifting gears and the rotation of the out-put shaft may be reversed without shifting gears.

Another object of our invention is to provide controls for a transmission of the type indicated having a brake associated therewith which are simple but efficient and which are easy to operate.

In its preferred form our invention contemplates the provision of a transmission and an associated brake. The transmission embodies an in-put shaft and an out-put shaft with means disposed between the two shafts for connecting or disconnecting the shafts and for reducing the speed of rotation imparted to the out-put shaft by the in-put shaft when connected. This means includes a pair of friction clutches one of which may be operated to connect the in-put shaft to the out-put shaft for driving it in one direction and the other of which may be operated to connect the in-put shaft to the out-put shaft in such a manner as to drive it in a reverse direction. If both clutches are rendered inoperative, the out-put shaft will be entirely disconnected from the in-put shaft. We preferably provide a plurality of gears in the transmission which may be shifted in order that different speeds of rotation of the out-put shaft may be obtained. The transmission is so arranged that the gears may be set to drive the out-put shaft at a selected speed and thereafter the in-put shaft and the out-put shaft may be connected or disconnected without shifting gears. Furthermore, the direction of rotation of the out-put shaft may be reversed without shifting gears. The brake is associated with a high-speed shaft driven by the in-put shaft and which is independent of the out-put shaft in order that the most effective braking action will be obtained. However, the brake shaft is connected continuously to the out-put shaft and the brake will be effective on the out-put shaft automatically whenever the drive between the in-put shaft and the out-put shaft is interrupted. The controls for the transmission and associated brake are very simple and are so arranged that when the forward and reverse clutches are both in neutral, the brake is applied.

The preferred embodiment of our invention is illustrated in the accompanying drawings wherein similar characters of reference designate corresponding parts and wherein.

Figures 1, 7:
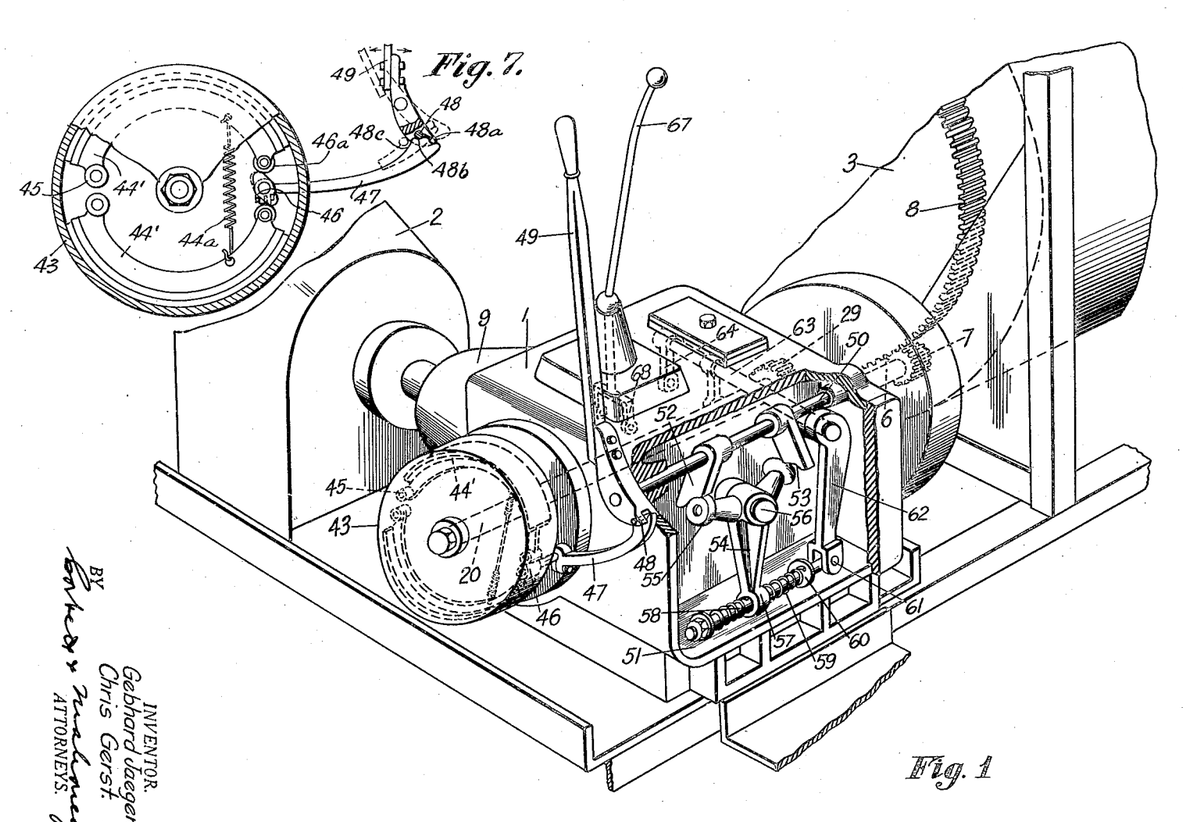
Figure 1 is a perspective view partly broken away illustrating our transmission assembly disposed between a power unit and means for rotating a mixing drum.
Figure 7 is a side elevation, partly broken away, of the brake controlling mechanism.

With reference to the drawings and particularly to Figure 1, we have illustrated a transmission 1, constructed in accordance with our invention, disposed between a power unit 2 and a mixing drum illustrated diagrammatically at 3. The transmission 1 in this instance connects the power unit to the means for driving the mixing drum.

Figure 2:
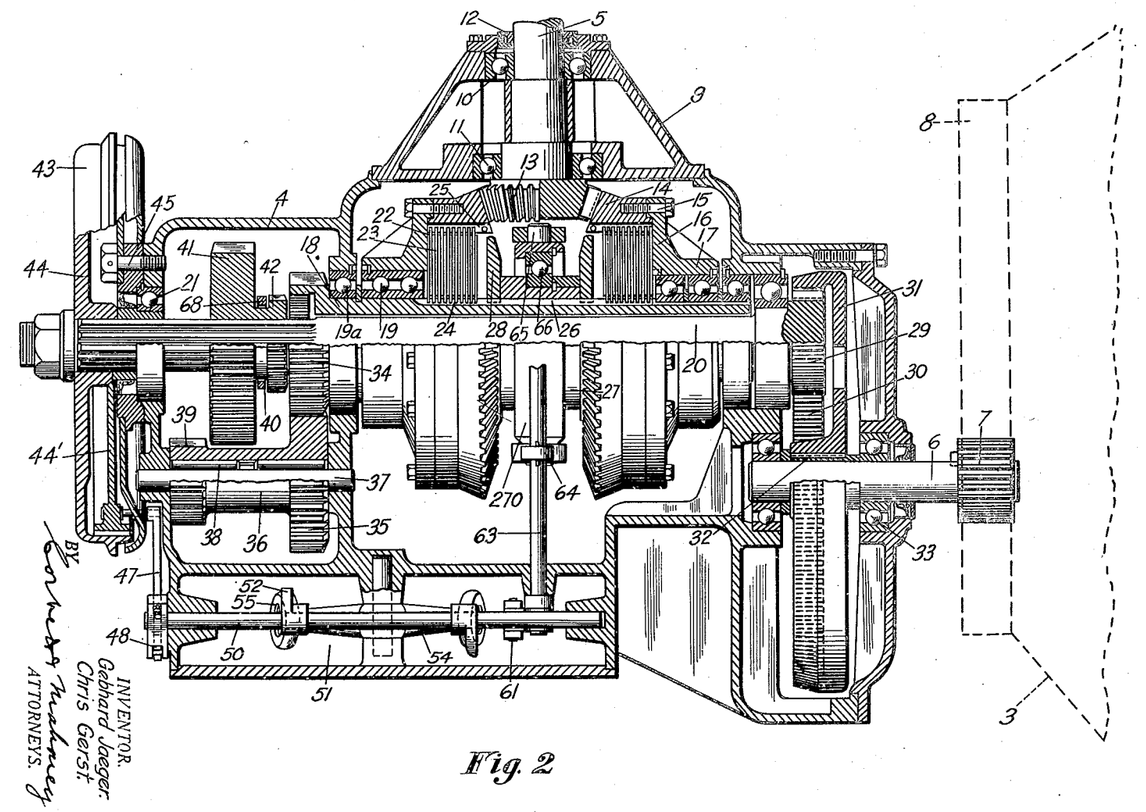
Figure 2 is a view mainly in section illustrating a transmission mechanism constructed in accordance with the principles of our invention.

One form of our transmission is illustrated in detail in Figure 2. It consists of a housing 4 which is preferably of the shape indicated. At a suitable point an in-put shaft 5 leads into the housing and at another point remote therefrom an out-put shaft 6 leads from the housing. The in-put shaft 5 is coupled to the drive shaft of the power unit 2. The out-put shaft carries a pinion 7 on its outer end which meshes with a bull gear 8 carried by the mixing drum. We provide means between the in-put shaft 5 and the out-put shaft 6 for operatively connecting the shafts together or for disconnecting them. This means when connecting the two shafts will reduce the speed of rotation of the out-put shaft relative to the in-put shaft. Furthermore, this means is of such a nature that the out-put shaft may be driven in a forward or reverse direction. We also provide means for changing the speed of rotation of the out-put shaft and for exerting a braking action on such shaft at the proper time.

The in-put shaft is rotatably carried by a member 9 secured to the housing. A ball bearing 10 is provided at the outer end of the member 9 and a ball bearing 11 is provided at the inner portion thereof. A sealing nut 12 is also associated with the shaft 5 adjacent the outer end thereof. The shaft 5 is driven continuously by the power unit 2. On its inner end the shaft 5 has a bevel gear 13 integral therewith. This bevel gear 13 is always in mesh with a pair of rotatable ring gears 14 which face towards each other and are disposed on opposite sides of the gear 13. Each ring gear 14 is removably bolted by means of a plurality of circumferentially spaced bolts 15 to a disk-like member 16. This disk-like member 16 has a hub 17 which is rotatably mounted on a hollow shaft 18 by means of a ball bearing 19. The hollow shaft 18 is rotatably carried on a high speed shaft 20 by the ball bearings 19a disposed at opposite ends thereof. The shaft 20 is rotatably carried in ball bearings 21 disposed at opposite ends thereof.

In order to clutch the ring gears 14 to the hollow shaft 18 when desired, we provide a pair of clutches indicated generally by the numerals 22. One of these clutches is adapted to be actuated to drive the shaft 18 in one direction and the other clutch is adapted to be actuated to drive the shaft 18 in the opposite direction. The clutches 22 are of the usual friction disk type. Each clutch comprises a plurality of driving disks 23 and a plurality of driven disks 24 which alternate and each of which is provided with a central opening so that it may be slipped on the shaft 18. All of the disks are disposed within the ring gear 14 which serves as a housing for such disks. The driving disks 23 are splined to the gear 14 by means of a plurality of notches (not shown) formed in the periphery of the disks 23 which cooperate with a plurality of gear teeth 25 formed on the inner surface of the ring gear 14. These driving disks 23, however, are free to rotate relative to the hollow shaft 18. The driven disks 24 are free to rotate relative to the driving gear 14 but are splined to the shaft 18 by means of notches (not shown) formed in the edge of the central opening of each disk 24, these gear teeth cooperating with a plurality of longitudinally extending teeth 26 formed on the outer surface of shaft 18. If the driving disks 23 and the driven disks 24 are forced tightly together, the ring gear 14 will be clutched to the shaft 18. However, if these disks are not forced together, the ring gear 14 can rotate relative to the shaft 18.

In order to force the disks of the two clutches together, we provide a collar 27 which is disposed on the shaft 18 between the two clutches and is splined thereon for longitudinal movement. At opposite sides thereof this collar carries disk-like members 28. Each member 28 is adapted to be moved within the cooperating ring gear 14 until it contacts with the disks of the clutch and forces them together. It will be apparent that when one clutch is rendered operative, the other clutch is rendered inoperative. However, both clutches may be rendered inoperative by having the member 27 in the neutral position indicated in Figure 2. We provide suitable means, to be described subsequently, for moving the collar member 27 longitudinally of shaft 18.

Thus, it will be apparent that the ring gears 14 will be driven continuously by the shaft 5. As long as both clutches 22 are inoperative, the ring gears 14 will merely rotate relative to the shaft 18. However, when one clutch is operative, one of the ring gears will be clutched to the shaft 18 for rotating it in one direction and when the other clutch is operated the other ring gear 14 will be clutched to the shaft 18 and will drive it in an opposite direction.

As previously indicated, the high-speed shaft 20 is free to rotate within the hollow shaft 18. This shaft carries a pinion 29 at one end thereof. This pinion 29 meshes with an internal gear 30 carried by a disk member 31 which is keyed to the out-put shaft 6 as at 32. The out-put shaft 6 is rotatably mounted in a pair of ball bearings 33 supported by the housing. Thus, it will be apparent that the shaft 20 serves to drive the out-put shaft 6.

We provide means for connecting the hollow shaft 18 to the shaft 20 in order that the shaft 20 will be driven by the hollow shaft. This means is of such a nature that it may be selectively operated to drive the shaft 20 at different rates of speed. The shaft 18 is provided with a gear 34. This gear 34 is both an external and internal gear. The teeth on the outer surface thereof are always in mesh with a gear 35 of a double gear unit 36. This unit 36 is rotatably mounted on a stub shaft 37, which is supported by the housing, by means of a roller bearing 38. The unit 36 also has a pinion 39 formed thereon. Thus, the double gear unit 36 will be driven by the hollow shaft 18.

At the same end of the shaft 20 we provide a double gear unit 40 which is splined on the shaft 20 as indicated. This double gear unit embodies a large gear 41 and a pinion 42. The unit 40 may be shifted longitudinally of the shaft 20 by means to be subsequently described. In Figure 2 the unit 40 is illustrated in neutral position. In order for the hollow shaft 18 to drive the shaft 20 at a high rate of speed, the unit 40 is shifted so that the pinion 42 will move within the gear 34 and mesh with the teeth on the interior thereof. In order for the hollow shaft 18 to drive the shaft 20 at a slower rate of speed, it is merely necessary to shift the unit 40 on the shaft 20 to disengage pinion 42 from gear 34 and to engage the gear 41 with the pinion 39.

Thus, it will be apparent that with this arrangement the shaft 20 may be driven at selected speeds and, consequently, the out-put shaft 6 may be driven at selected speeds. It will also be apparent that the gears may be shifted to drive the shaft 20 at a selected speed and the shaft may then be driven in one direction and then reversed merely by operating the clutches 22 and without shifting gears. The clutches may be operated as desired without shifting gears. The hollow clutch shaft or sleeve 18 is, thus, normally connected to the shaft 20, although this connection may be broken by having the shiftable gears in neutral position.

In order to exert a braking action on the out-put shaft when the drive between the in-put shaft and the out-put shaft is interrupted, we provide a brake unit 43 (Figures 1, 2 and 7) which is associated with the end of the shaft adjacent the shiftable gears. This brake 43 is preferably of the usual automotive type. It embodies a drum member 44 which is mounted on the end of shaft 20 in such a manner that it will rotate therewith. It also includes a pair of arcuate shoes 44' the adjacent ends of which are pivoted to the housing of the transmission as at 45. The opposite free ends of the brake shoes are disposed adjacent each other and means indicated generally at 46 is provided for expanding these shoes into contact with the interior of the drum. Suitable means to be described later is provided for actuating the brake.

It will be noted that the brake drum of the brake unit is carried by the high speed shaft 20. Since this shaft is independent of the out-put shaft 6 and is connected to the out-put shaft by speed-reducing gearing, more effective braking action will be obtained on the shaft 6 than if the brake drum were carried directly on the shaft 6. The shaft 20 on which the brake drum is mounted is continuously connected to the shaft 6 through gears 29 and 30. Thus, the brake is continuously connected to the out-put shaft, regardless of whether sliding gear unit 40 is in a neutral position or in mesh with pinion 39 or directly connected to hollow shaft 18. The brake is always connected to the out-put shaft by means of speed-reducing gearing 29 and 30 which makes it possible for the brake to apply more torque to the shaft 6 and, therefore, a more effective braking action will be obtained.

We will now describe the controls for the brake, clutches and the means for shifting the gears. As illustrated best in Figures 1 and 7, the brake unit is operated by a link 47 which operates the brake shoe expanding means 46. The link 47 has its outer end operatively connected to the lower end of a hand-operated main control lever 49. The lever 49 carries a pin 48 which may occupy any of the positions in contact with lever 47, indicated by numerals 48a, 48b, 48c, in Figure 7. When in position 48b, the brake is applied but when in either position 48a or 48c, the brake is released. This lever 49 is adapted to rotate a shaft 50 which is disposed in the upper portion of a chamber 51 formed at one side of the housing. A pair of cam members 52 are keyed to this shaft. These cam members are spaced apart and extend downwardly from the shaft in opposite directions at an angle to a vertical plane passing through the axis of the shaft. The lower end of each cam member has a curved notch 53 formed therein.

Disposed in the compartment 51 directly below the shaft 50 is a Y-shaped member 54. The upper end of each of the arms of the Y-shaped member has a roller 55 mounted thereon. The Y-shaped member is pivoted to the wall of the chamber 51 by means of a pin 56. The lower end of the leg of this member has a sleeve 57 formed thereon through which a rod 58 projects. A compression spring 59 is disposed in surrounding relation to rod 58 on each side of the sleeve 57. Collars 60 prevent longitudinal movement of the springs on the rod. The end of the rod is pivotally connected as at 61 to the lower end of an arm 62. The upper end of this arm 62 is keyed to a horizontally extending shaft 63. This shaft 63 extends into the transmission over the collar 27 disposed between the clutches 22. The shaft 63 has a pair of depending members 64 keyed thereon which have forks on their lower ends that engage rollers 65 carried by the member 27 at diametrically opposed points. The rollers 65 are carried by a collar 270 which is mounted on the collar 27 by means of a ball bearing 66. Thus, collar 27 may rotate relative to collar 270. It will be apparent that when the shaft 63 is rotated, the member 27 will be moved longitudinally of sleeve 18 and will operate one of the clutches 22.

When the controls are in the position indicated in Figures 1 and 7, the two clutches 22 are inoperative and the brake is applied. If the lever 49 is swung in either direction, the brake will be released and one of the clutches 22 will be actuated. In swinging the lever 49, the shaft 50 is rotated which causes one of the cams 52 to contact with its roller 55 and the other cam 52 to move away from its roller. This causes the Y-shaped member 54 to pivot about the pin 56 and to force the rod 58 in one direction swinging the arm 62 in a corresponding direction and, consequently, rotating the shaft 63 in a corresponding direction. As previously stated, rotation of the shaft 63 in one direction will actuate one of the clutches 22. The springs 59 serve as cushioning springs, and to take up wear of the clutch plates or disks. The portion 53 of each cam 52 will cooperate with the corresponding roller 55 to lock the Y-shaped member 64 in any position to which it is moved by means of hand lever 49. Thus, it will be apparent that by merely operating the hand lever 49, either clutch 22 may be actuated or both may be rendered inoperative. It will also be apparent that each time the hand lever is operated to actuate one of the clutches, the brake is automatically released and each time both clutches are rendered inoperative, the brake is automatically applied.

A gear shift lever 67 is also provided. This gear shift lever actuates a yoke 68 which moves the double gear unit 40 longitudinally of the shaft 20.

It will be apparent that the transmission which we have provided is of very simple and compact structure and is of very rugged construction. Furthermore, it will be apparent that we have provided a brake associated with the transmission which is so arranged that maximum braking action will be obtained on the out-put shaft. The brake is continuously connected to the out-put shaft and each time the drive between the in-put shaft and the out-put shaft is interrupted, the brake will automatically be effective to prevent rotation of the out-put shaft and, consequently, of the mixing drum. The transmission is of a multi-speed type and is of such a nature that it may be set at a certain speed and the drive between the in-put shaft and the out-put shaft may be connected or disconnected without shifting gears and the direction of rotation of the out-put shaft may be reversed without shifting gears.

Figure 3:
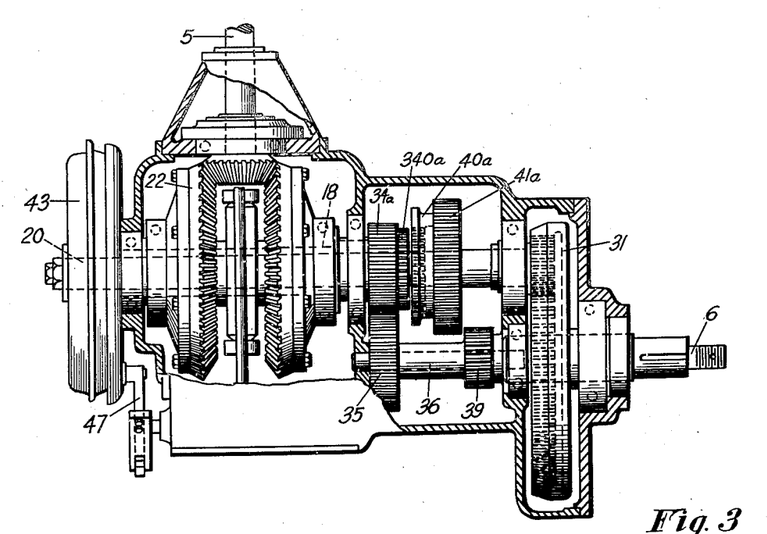
Figure 3 is a similar view showing a transmission similar to that illustrated in Figure 2 but with the parts thereof rearranged.

In Figure 3 we have illustrated a transmission similar to that illustrated in Figure 2 but with the parts rearranged. The parts of this transmission are practically identical with the corresponding parts of the unit illustrated in Figure 2. However, in this instance the friction clutches are disposed between the brake unit 43 and the unit for changing the speed of rotation of the out-put shaft. The speed-changing unit is slightly different. A gear 34a is formed on the end of hollow shaft 18. This gear meshes with gear 35 of the double gear unit 36. The gear 34a has a second gear portion 340a which meshes with an internal gear portion of a double gear 40a which is mounted on shaft 20 for longitudinal movement thereon. This gear unit 40a has a large gear 41a which may be brought into mesh with the pinion 39 of the gear unit 36. The gear 34a normally drives the unit 36 through gear 35. For low speed the gear 41a is brought into engagement with the pinion 39. For high speed the internal gear portion of the unit 40a is brought into engagement with the portion 340a of gear unit 34a.

It will be apparent that this form of transmission is practically the same as that illustrated in Figure 2 and has the same features and advantages, and might be preferable whenever there is a space limitation.

Figure 4:
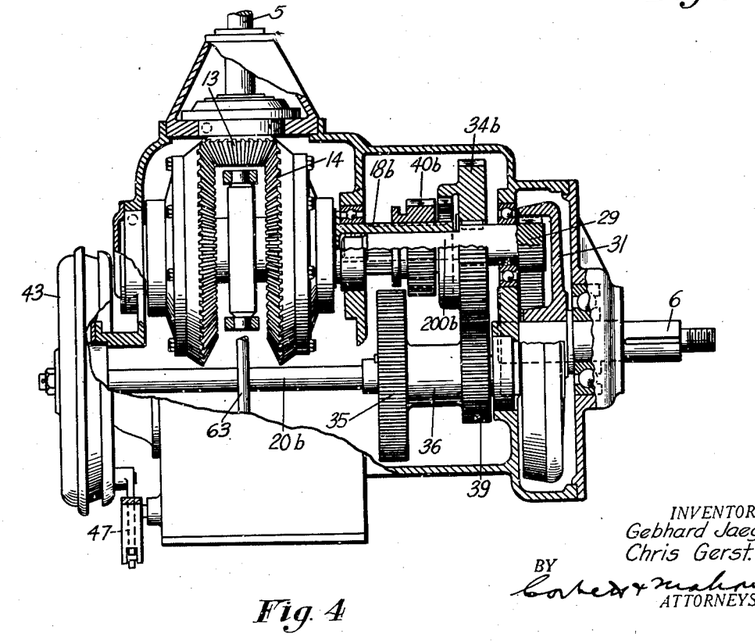
Figure 4 is a similar view showing a modified form of transmission constructed in accordance with the principles of our invention.

In Figure 4 we illustrate a slightly modified form of transmission. This transmission comprises an in-put shaft 5 and an out-put shaft 6 as before. The shaft 5 continuously drives ring gears 14 by means of bevel gear 13 as before. The gears 14 are carried by a hollow shaft 18b and friction clutches are provided, as before, for clutching either of the gears 14 to the shaft 18b. However, in this instance the brake unit 43 is carried by a shaft 20b which does not pass through the shaft 18b, as in the forms previously described, but which is disposed in independent spaced parallel relationship to the shaft 18b. The shaft 20b carries a gear unit 36 on one end thereof which embodies a small gear 39 and a large gear 35. The shaft 18b has an extension upon which a gear 40b is splined. A stub shaft 200b is rotatably mounted in the extension of the shaft 18b. This stub shaft carries a gear unit 34b embodying a large external gear and a small internal gear. The external gear is always in mesh with the gear 39. For high speed the unit 40b will be shifted so that it meshes with the internal gear of the unit 34b. This will connect the extension of shaft 18b to the shaft 200b and will rotate pinion 29 at a low rate of speed. For low speed the unit 40b should be shifted until it meshes with gear 35 of unit 36. This will cause rotation of gear 34b and, consequently, shaft 200b at a low rate of speed and the pinion 29 will also be rotated at a low rate of speed.

It will be apparent that with this form of device the brake unit is continuously connected to the out-put shaft through gearing which will result in the application of considerable torque by the brake to the out-put shaft. The controls for this unit will be the same as the controls for the other units. Thus, each time that the two clutches are rendered inoperative, the brake unit 43 will automatically exert a braking action on the out-put shaft and because of the arrangement of the brake, it being on a high-speed shaft, maximum braking action will be obtained. Thus, practically all the advantages of the other forms of our invention are retained in this form.

Figure 5:
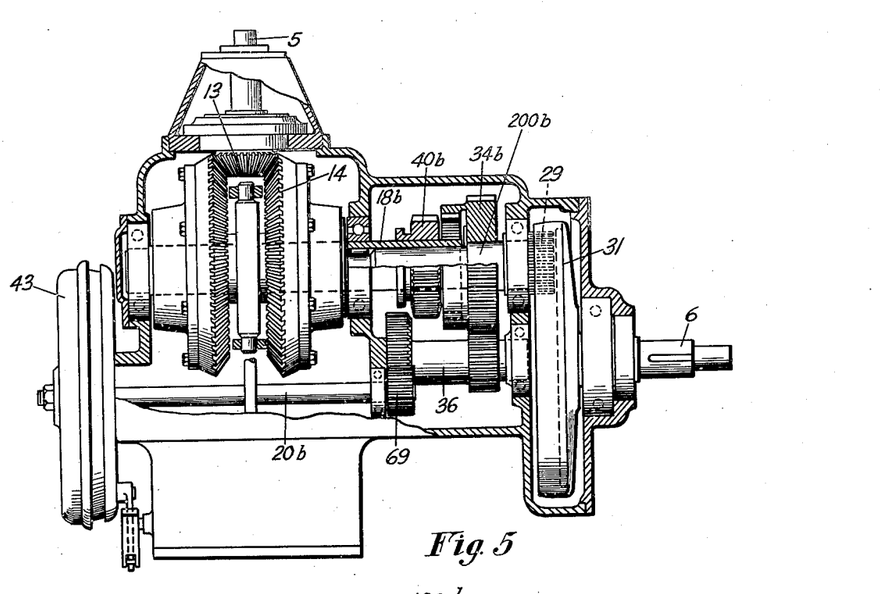
Figure 5 is a similar view showing a transmission similar to that illustrated in Figure 4 but of slightly modified form.

Figure 5 shows another form of our invention which is almost identical with that illustrated in Figure 4. In this form the gear unit 36 is not carried by the shaft 20b but is carried by an independent shaft. The unit 36 is connected to the shaft 20b by means of a pinion 69. The other parts are practically identical with the parts of the device illustrated in Figure 4. Thus, it will be apparent that with this unit the advantageous features of the other units are retained. The brake unit is carried by a shaft independent of the out-put shaft but which is continuously connected to the output shaft by gearing which results in the brake applying maximum torque to the out-put shaft.

Figures 6, 8:
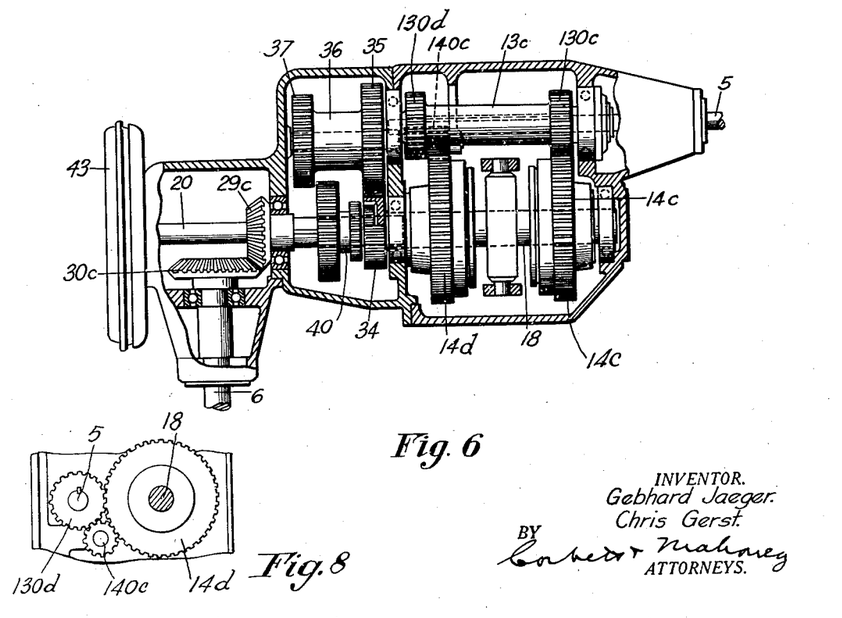
Fig. 6 is a view mainly in detail of a further modified form of transmission made in accordance with the principles of our invention.
Figure 8 is a detail in vertical section of a portion of the transmission shown in Figure 6.

Figures 6 and 8 show another modified form of transmission constructed in accordance with the principles of our invention and similar to the form illustrated in Figure 2. In this form the in-put shaft 5 enters the housing at one end thereof. This shaft has a gear unit 13c keyed thereon which embodies a pair of pinions 130c and 130d. Pinion 130c meshes with a ring gear 14c while the other pinion 130d drives another ring gear 14d in an opposite direction by means of a long pinion 140c. The pinion 140c is in mesh with the pinion 130d and the gear 14d disposed adjacent thereto. This pinion is an idler pinion provided for causing the cooperating gear 14d to rotate in a direction opposite to that of the rotation of the other ring gear 14c. Friction clutches are associated with each of the ring gears 14c and 14d to clutch them to a shaft 18.

The shaft 18 carries a combined external and internal gear 34 on its one end. The outer portion of this gear 34 meshes with a gear 35 of the double gear unit 36 which also includes a gear 37. A shaft 20 extends through the hollow shaft 18 and is free to rotate therein, as in the form illustrated in Figure 2. A double gear unit 40 is mounted on the shaft 20 for longitudinal movement. The means for changing the speed of this form of our device is exactly the same as that of Figure 2 and they function in the same manner to drive the shaft 20 at different rates of speed. A brake unit 43 is associated with the shaft 20 in the same manner as in the form illustrated in Figure 2. A bevel gear 29c is keyed to the shaft 20 and drives a second bevel gear 30c which is carried by the out-put shaft 6. This unit will function in practically the same manner as the unit illustrated in Figure 2 and will have practically the same advantages.

It will be apparent that the transmission which we have provided is a very simple and compact structure and is of very rugged construction. Furthermore, it will be apparent that we have provided a brake associated with the transmission which is arranged so that maximum braking action will be obtained. The brake is continuously connected to the out-put shaft each time the drive between the in-put shaft and out-put shaft is interrupted by means of clutches. The brake will automatically be effective preventing rotation of the out-put shaft and mixing drum. The transmission is of the multi-speed type having the multi-speeds arranged such as to permit selecting and shifting without any difficulties. This has been accomplished by inserting multi-speeds after bevel gear reduction and behind clutches. When both clutches are inoperative all gears of multi-speed transmission are also inoperative permitting a trouble-free selection and engagement. The transmission may be set at a certain speed and the drive between the in-put and out-put shaft may be connected or disconnected without shifting gears and the direction of rotation of the out-put may be reversed without any gear shifts.

Other advantages will be apparent from the description, the drawings and the following claims.

Having thus described our invention, what we claim is:

1. A device for transmitting power from a power unit to a driven unit comprising an in-put shaft and an out-put shaft, a pair of gears rotatably mounted on a hollow shaft and adapted to be driven by the in-put shaft, a clutch associated with each of said gears for selectively clutching it to the hollow shaft on which it is mounted, a brake shaft extending into said hollow shaft, a brake unit associated with said brake shaft, gearing for normally connecting the hollow shaft to the brake shaft, and gearing for continuously connecting the brake shaft to the out-put shaft.

2. A device for transmitting power from a power unit to a driven unit comprising an in-put shaft and an out-put shaft, a pair of gears rotatably mounted on a hollow shaft and adapted to be driven by the in-put shaft, a clutch associated with each of said gears for selectively clutching it to the hollow shaft, a brake shaft extending into said hollow shaft, a brake unit associated with said brake shaft, gears for normally connecting the hollow shaft to the brake shaft, said gears being shiftable so that the brake shaft will be driven at different rates of speed, and gears for continuously connecting the brake shaft to the out-put shaft.

3. A device for transmitting power from a power unit to a driven unit comprising an in-put shaft, a hollow clutch shaft, an intermediate shaft extending through said hollow shaft, an out-put shaft, clutching means for connecting and disconnecting said in-put shaft to said hollow shaft, multi-speed gearing connecting said hollow shaft to said intermediate shaft, means for continuously connecting said intermediate shaft to said out-put shaft, a brake unit mounted on said intermediate shaft, said intermediate shaft connecting the brake unit and out-put shaft at all times regardless of the selected speed or position of said multi-speed gearing.

4. A device for transmitting power from a power unit to a driven unit comprising an in-put shaft, a hollow clutch shaft, an intermediate shaft, an out-put shaft, clutching means to connect and disconnect said in-put shaft to said hollow clutch shaft, said hollow clutch shaft being independently mounted and surrounding said intermediate shaft, a brake unit mounted on said intermediate shaft, and a multi-speed transmission to drive said intermediate and out-put shaft at preselected speeds.

5. A device for transmitting power from a power unit to a driven unit comprising an in-put shaft, a hollow clutch shaft, an intermediate shaft, an out-put shaft, said clutch shaft surrounding said intermediate shaft, clutching means to connect and disconnect said in-put shaft to said hollow clutch shaft, a multi-speed transmission adjacent to said clutching means, and a brake unit mounted on said intermediate shaft and adjacent to said multi-speed transmission.

6. A device for transmitting power from a power unit to a driven unit comprising an in-put shaft, a hollow clutch shaft, an intermediate shaft, an out-put shaft, a brake unit, a multi-speed transmission, clutching means to connect and disconnect said in-put shaft to said hollow clutch shaft, said brake unit being mounted on said intermediate shaft and located on one side of said clutching means, said multi-speed transmission being located on the other side of said clutching means, and said hollow clutch shaft surrounding said intermediate shaft.

7. A device for transmitting power from a power unit to a driven unit comprising an in-put shaft and an out-put shaft, means for selectively connecting and disconnecting the shafts, said means including a separate intermediate clutch shaft and a clutch associated therewith for connecting said in-put shaft to said clutch shaft or disconnecting said shafts, a brake unit for applying a braking force to the out-put shaft, said brake unit being associated with a shaft independent of the out-put shaft and the clutch shaft but which is continuously connected to the out-put shaft, and multi-speed means for connecting the clutch to the brake shaft.

8. A device for transmitting power of a power unit to a driven unit comprising an in-put shaft and an out-put shaft, means for selectively connecting and disconnecting the shafts, said means including a separate intermediate clutch shaft and a clutch associated therewith for connecting said in-put shaft to said clutch shaft or disconnecting said shafts, a brake unit for applying a braking force to the out-put shaft, said brake unit being associated with a shaft independent of the out-put shaft and the clutch shaft, gearing for continuously connecting the brake shaft to the out-put shaft, and shiftable gears for connecting the clutch shaft to the brake shaft so that the brake shaft may be driven at different rates of speed.

9. A device for transmitting power from a power unit to a driven unit comprising an in-put shaft and an out-put shaft, means for selectively connecting and disconnecting the shafts, said means including a separate intermediate clutch shaft and a clutch associated therewith for connecting said in-put shaft to said clutch shaft or disconnecting said shafts, a brake unit for applying a braking force to the out-put shaft, said brake unit being associated with a shaft independent of the out-put shaft and the clutch shaft, gearing for continuously connecting the brake shaft to the out-put shaft, shiftable gears for connecting the clutch shaft to the brake shaft so that the brake shaft may be driven at different rates of speed, means for operating said clutch and said brake, said means being of such a nature that each time the clutch is rendered inoperative the brake will be applied, and means independent of said last-named means for shifting said gears.

10. A device for transmitting power from a power unit to a driven unit comprising an in-put shaft and an out-put shaft, means for selectively connecting and disconnecting said shafts, said means including a separate intermediate clutch shaft and a pair of clutches associated therewith for connecting said in-put shaft to said clutch shaft or disconnecting said shafts, one of said clutches being provided for driving the clutch shaft in one direction and the other of said clutches being provided for driving the clutch shaft in a reverse direction, a brake unit for applying a braking force to the out-put shaft, said brake unit being associated with a shaft independent of the out-put shaft and the clutch shaft, gearing for continuously connecting the brake shaft to the out-put shaft, said gearing being adapted to increase the torque applied to the out-put shaft by the brake unit, and gearing for connecting the clutch shaft to the brake shaft.

11. A device for transmitting power from a power unit to a driven unit comprising an in-put shaft and an out-put shaft, a separate intermediate clutch shaft having a pair of gears rotatably mounted thereon and adapted to be driven by the in-put shaft, a clutch associated with each of said gears for selectively clutching it to the clutch shaft on which it is mounted, a brake unit for applying a braking force to the out-put shaft, said brake unit being associated with a shaft independent of the out-put shaft and the clutch shaft, gears for continuously connecting the brake shaft to the out-put shaft, said gears being adapted to increase the torque applied by the brake shaft to the out-put shaft, and gears for normally connecting the clutch shaft to the brake shaft, said gears being shiftable so as to drive the brake shaft at different rates of speed.

12. A device for transmitting power from a power unit to a driven unit comprising an in-put shaft and an out-put shaft, a separate intermediate clutch shaft having a pair of gears rotatably mounted thereon and adapted to be driven continuously by the in-put shaft in opposite directions upon rotation of said in-put shaft, a clutch associated with each of said gears for selectively clutching it to the shaft on which it is mounted, a brake unit for applying a braking force to the out-put shaft, said brake unit being associated with a shaft independent of the out-put shaft and the clutch shaft, gears for continuously connecting the brake shaft to the out-put shaft, gears for normally connecting the clutch shaft to the brake shaft, said gears being shiftable so that the brake shaft may be driven at different rates of speed, means for operating said clutches, means operating in response to said last-named means for applying said brake whenever both of said clutches are rendered inoperative and for releasing the brake whenever one of said clutches is rendered operative, and means independent of the clutch and brake-operating means for shifting the gears that connect the clutch shaft to the brake shaft.

13. A device for transmitting power from a power unit to a driven unit comprising an in-put shaft and a separate clutch shaft, means for selectively connecting and disconnecting the shafts, said means including a clutch associated with the clutch shaft, a brake unit, said brake unit being associated with a shaft independent of the clutch shaft, and change speed gearing for connecting the brake shaft to the clutch shaft.

14. A device for transmitting power from a power unit to a driven unit comprising an in-put shaft and a separate clutch shaft, means for selectively connecting and disconnecting the shafts, said means including a pair of gears rotatably mounted on the clutch shaft and adapted to be driven by the in-put shaft, a clutch associated with each of said gears for clutching it to the clutch shaft, a brake unit, said brake unit being associated with a shaft independent of the clutch shaft, and change speed gearing for connecting the brake shaft to the clutch shaft.

15. A device for transmitting power from a power unit to a driven unit comprising an in-put shaft and an out-put shaft, a hollow shaft having a gear rotatably mounted thereon and which is adapted to be driven by the in-put shaft, a clutch associated with said gear for selectively clutching it to the hollow shaft on which it is mounted, a brake shaft extending into said hollow shaft, a brake unit associated with said brake shaft, gears for normally connecting the hollow shaft to the brake shaft, and gears for continuously connecting the brake shaft to the out-put shaft.

16. A device for transmitting power from a power unit to a driven unit comprising an in-put shaft and an out-put shaft, a pair of gears rotatably mounted on a hollow shaft and adapted to be driven by the in-put shaft, a clutch associated with each of said gears for selectively clutching it to the hollow shaft, a brake shaft extending into said hollow shaft, a brake unit associated with said brake shaft, gears for connecting the hollow shaft to the brake shaft, and gears for continuously connecting the brake shaft to the out-put shaft.

17. A device for transmitting power from a power unit to a driven unit comprising an in-put shaft, a hollow clutch shaft, an intermediate shaft extending through said hollow shaft, an out-put shaft, clutching means for connecting and disconnecting said in-put shaft to said hollow shaft, means for connecting said hollow shaft to said intermediate shaft, means for continuously connecting said intermediate shaft to said out-put shaft, and a brake unit mounted on said intermediate shaft.

18. In a device of the type described, an input shaft and an out-put shaft, means for selectively connecting and disconnecting said shafts, said means comprising a pair of clutches, one of said clutches being adapted to drive the out-put shaft in one direction and the other of said clutches being adapted to drive the out-put shaft in a reverse direction, means for selectively operating said clutches including a rotatable shaft, a brake unit for exerting a braking force on said out-put shaft, means for applying and releasing said brake, a shaft rotated by actuation of said last-named means, a pair of cams carried by said shaft, and a pivoted lever member adapted to be alternately engaged by said cams, said member being adapted to produce rotation of the shaft which actuates said clutches.

GEBHARD JAEGER.
CHRIS GERST.

CERTIFICATE OF CORRECTION.

Patent No. 2,180,469.                                November 21, 1939.

GEBHARD JAEGER, ET AL.

It is hereby certified that error appears in the printed specification of the above numbered patent requiring correction as follows: Page 2, second column, line 42, for the words "gear teeth" read notches; page 4, first column, line 12, for the reference numeral "64" read 54; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.